Sept. 2, 1924.
W. HOPWOOD
AUTOMATIC SHUT-OFF VALVE
Filed April 17, 1922  2 Sheets-Sheet 1
1,507,182
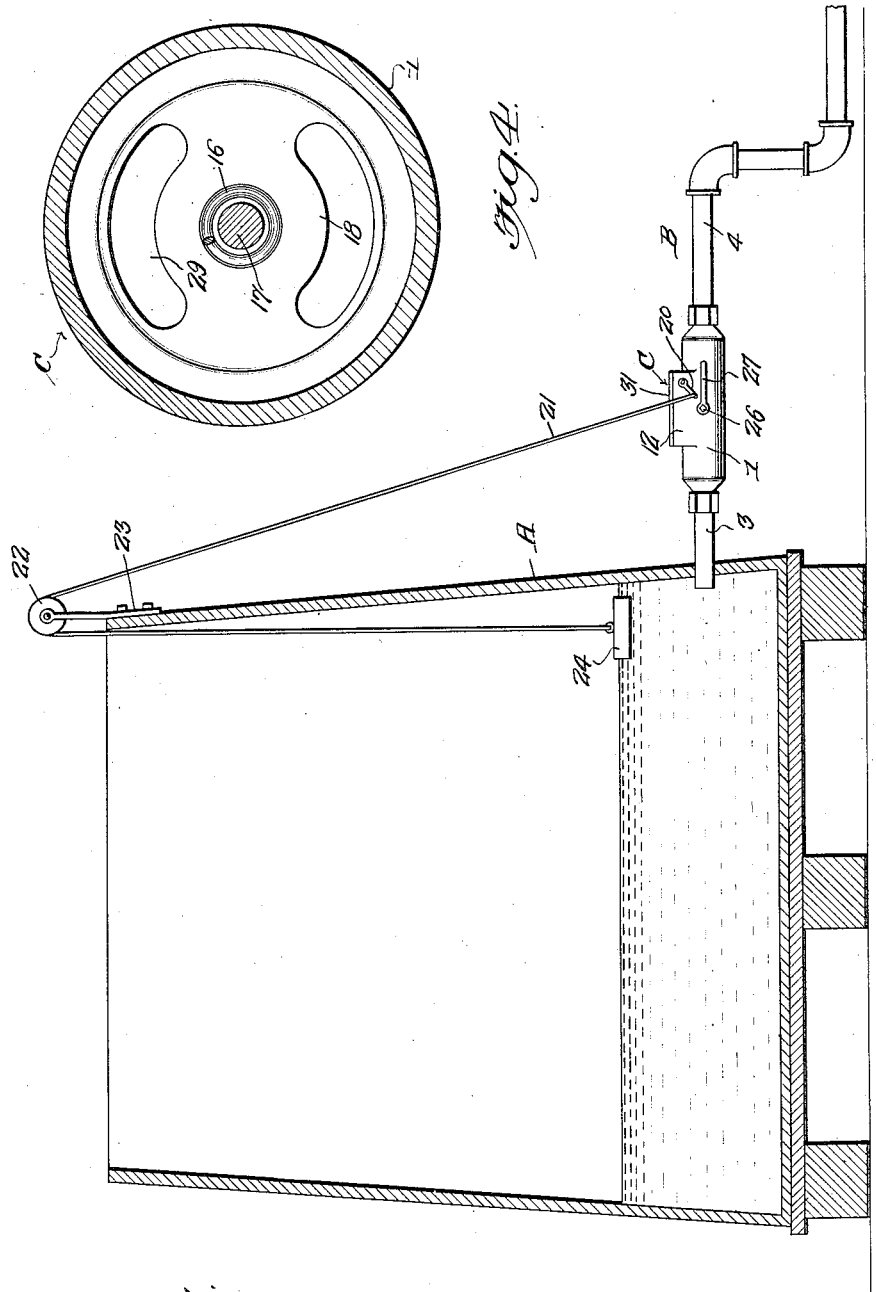
Inventor
*William Hopwood,*
By *John P. Dibble*
Attorney Sept. 2, 1924.
W. HOPWOOD
1,507,182
AUTOMATIC SHUT-OFF VALVE
Filed April 17, 1922   2 Sheets-Sheet 2
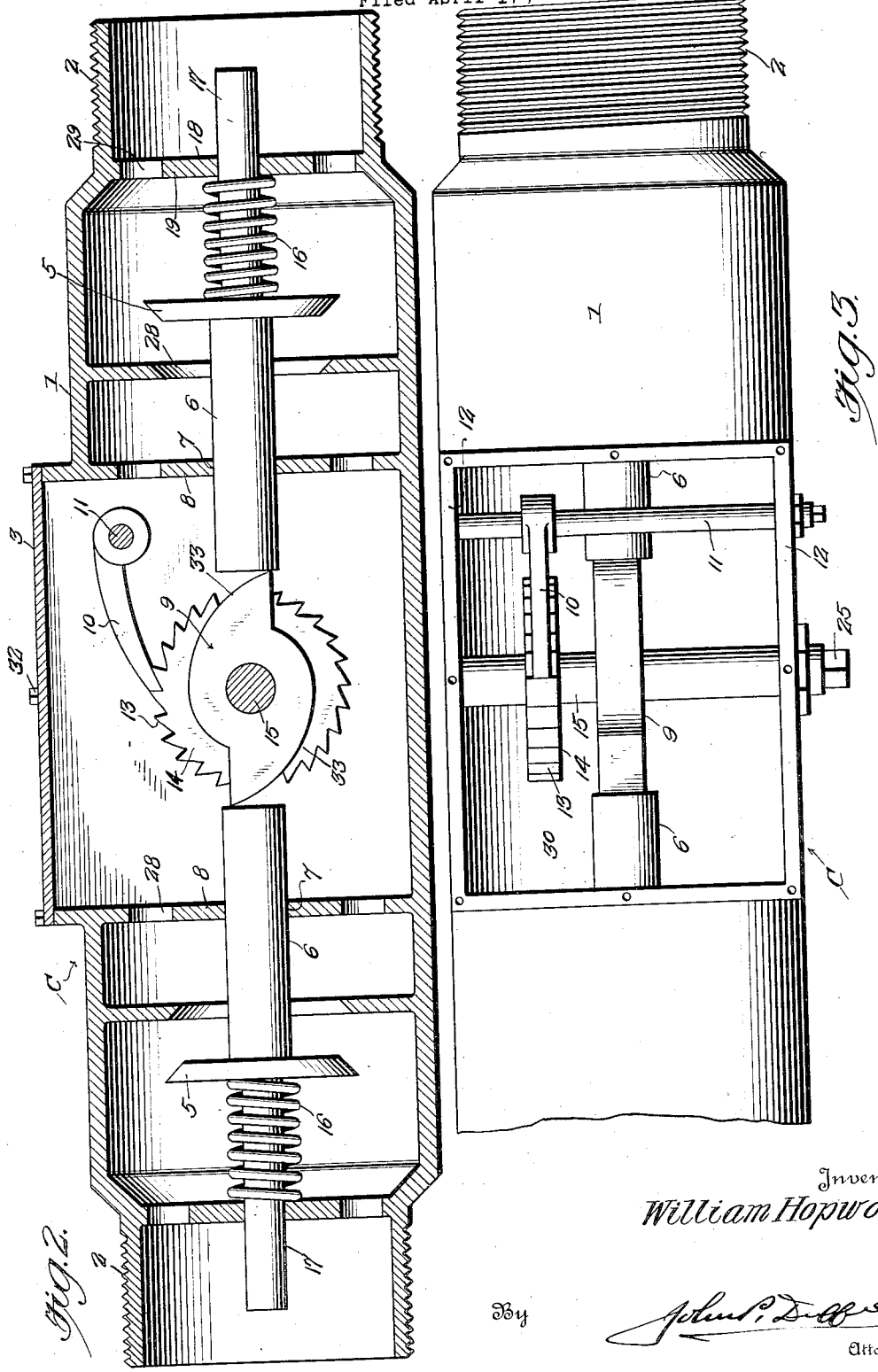
Inventor
William Hopwood
By
Attorney Patented Sept. 2, 1924.

1,507,182

UNITED STATES PATENT OFFICE.

WILLIAM HOPWOOD, OF TITUSVILLE, PENNSYLVANIA.

AUTOMATIC SHUT-OFF VALVE.

Application filed April 17, 1922. Serial No. 553,678.

*To all whom it may concern:*

Be it known that I, WILLIAM HOPWOOD, a citizen of the United States, residing at Titusville, in the county of Crawford and State of Pennsylvania, have invented certain new and useful Improvements in Automatic Shut-Off Valves, of which the following is a specification.

This invention relates to new and useful improvements in automatic shut-off valves and has for its object to provide a valve for automatically shutting off the flow of fluid from a stock oil tank to the discharge line before the fluid in the tank is lowered to a level with the latter, thus preventing the discharge or run line from filling with air.

It is the present custom of gaugers in the oil fields to open the valve in the discharge or run line to run the oil from a tank, and when this is done they are unable to perform other work or run other tanks at a distance in the field, but must shut the stop valve before the fluid has been lowered to the level of the discharge line to prevent this line from filling with air, which causes much trouble and expense in forcing the oil through the carrier lines. By means of my improved valve, the oil is automatically shut off at the desired level and the gauger is enabled to accomplish much more work and run more tanks in the same space of time.

With the foregoing and other objects in view that will appear as the nature of my invention is better understood, the same consists in the novel features of construction, combination and arrangement of parts illustrated in the drawings and more particularly pointed out in the appended claim.

In the accompanying drawings, which are for illustrative purposes only and are therefore not drawn to scale:—

Figure 1 is a sectional elevation, illustrating the application of my invention.

Figure 2 is a central longitudinal section of my improved automatic shut-off valve.

Figure 3 is a fragmentary plan view of Figure 2, with the cover removed and Figure 4 a vertical transverse section taken on line 4—4 of Figure 2.

Referring to the drawings for a more particular description of my invention and in which drawings like parts are designated by like reference characters throughout the several views, A designates a stock oil tank, B the discharge or run line communicating with the bottom of the tank and C my improved automatic shut-off valve.

As shown in the drawings, this valve comprises a cylindrical casing 1 provided at opposite ends with the exteriorly threaded nipples 2 which are connected with the sections 3 and 4 of the discharge or run line B. Reciprocatorily mounted in the casing 1 in horizontal alignment, are the valves 5, the stems 6 of which work through corresponding transverse openings 7 formed in the walls 8 of the casing. The valves 5 are normally held open by the double cam 9 whose opposite edges engage the inner ends of the valve stems 6. The cam 9 is held in this position by the dog 10 carried by the transverse rock shaft 11 journaled in the side walls 12 of the valve casing and engaging the teeth 13 of a ratchet 14 keyed to the transverse shaft 15 which is journaled also in the side walls 12 of the valve casing and carries the cam. Pressure is exerted against the valves 5 by the coil or helical springs 16 which are disposed around the guide rods 17 extending from the outer faces of the valves through corresponding guide openings 18 in the transverse outer walls 19 of the valve casing. The outer end of the rock shaft 11 is provided with a crank arm 20, to the free end of which is connected one end of a cord or cable 21 which extends upwardly over a pulley 22 journaled to the bracket 23 at the top of the stock oil tank and thence downwardly into the interior of the latter with its free end carrying a float 24. One end of the shaft 15 extends through the corresponding side wall 12 and is provided with a squared portion 25 which is adapted to be engaged by one end, as 26, of the crank handle 27 which is swung from a vertical depending position to a horizontal position, as indicated in Figure 1 of the drawings, to move the valves 5 outwardly away from their valve seats 28 against the tension of the coil springs 16.

The walls 8 and 19 are provided with transverse openings 28 and 29, respectively, to permit the flow or egress of the oil through the valve casing, while the top of the casing is provided with a rectangular opening 30 which facilitates the assembling of the parts. The opening 30 is closed by the cover 31 held in position by the bolts or screws 32.

In practice, the crank handle 27 is swung from a depending vertical position to a horizontal position, as shown in Figure 1 of the drawings, which turns the shaft 15 in the direction indicated by the arrow in Figure 2 and during which operation the cam surfaces 33 work against the inner ends of the valve stems and move the valves away from their seats 28 against the tension of the coil springs 16. When the handle 27 is released by the operator, the parts are held in the position shown in Figure 2 by the pawl and ratchet. The device is set so that before the oil in the stock tank reaches the level of the discharge or run line, the weight 24 exerts a pull on the cord or cable 21 which turns or rocks the shaft 11 through the medium of the crank arm 20 and disengages the dog or pawl 20 from the ratchet wheel 14, when the springs 16 cause the valves 5 to close the valve openings or seats 28 and automatically shut off the discharge or run of the oil from the stock tank.

From the foregoing description taken in connection with the drawings, it is thought that the construction, operation and advantages of my invention will be readily understood without requiring a more extended explanation.

Various changes in the forms, proportions and minor details of construction may be resorted to without departing from the principal or sacrificing any of the advantages of this invention as defined in the appended claim.

Having described my invention, what I claim as new and desire to secure by Letters Patent, is:—

In combination with a tank and a flow pipe connected with the lower portion thereof, a valve structure connected in the flow pipe and comprising a casing having spaced valve seats, the face of one of which is disposed in the direction opposite of the flow from the tank and the other having its face disposed in the direction of the flow from the tank, spring pressed valves located in the casing and arranged to close against the seats respectively, manually operable means for simultaneously moving the valves away from the seats and against the pressure of the springs, latch mechanism for holding the valves at open position with relation to the seats and a float device connected with the latch mechanism and operated by the level of the liquid in the tank to release the valve opening means whereby the valves under tension from their respective springs may simultaneously close against the oppositely disposed seat faces and thereby interrupt the flow of liquid in either of two directions through the casing and pipe.

In testimony whereof I affix my signature.

WILLIAM HOPWOOD.